May 27, 1930.  L. E. WAITE  1,760,329
WHEEL
Filed April 18, 1929
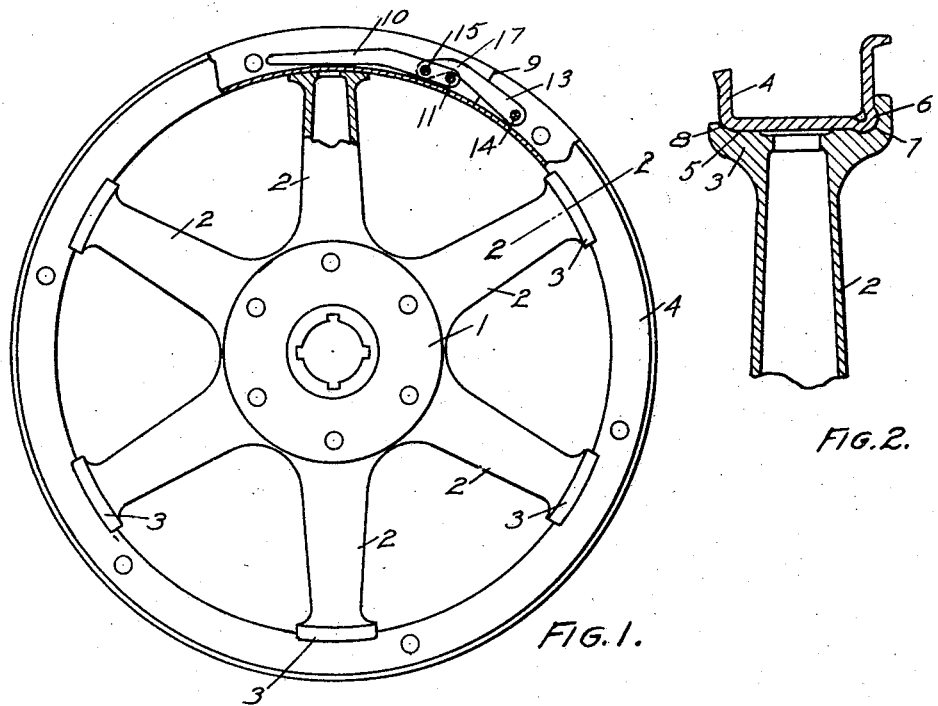
FIG.1.
FIG.2.
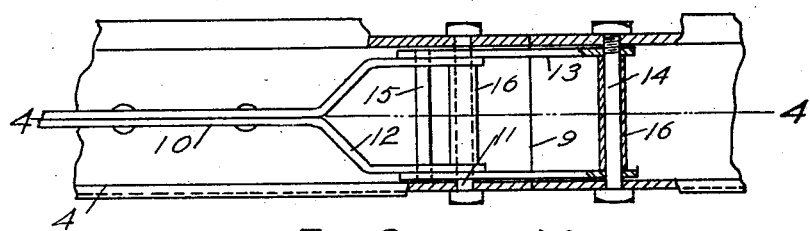
FIG.3.
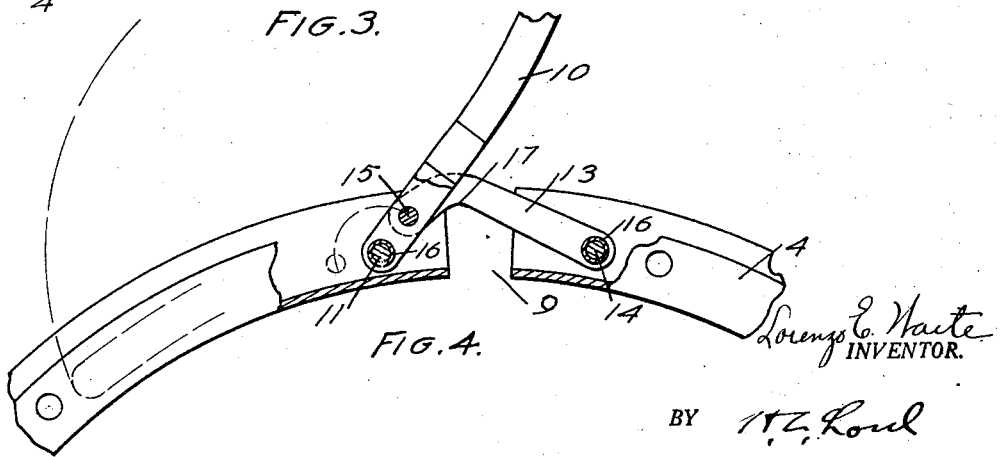
FIG.4.
Lorenzo E. Waite
INVENTOR.
BY
ATTORNEYS.

Patented May 27, 1930

1,760,329

UNITED STATES PATENT OFFICE

LORENZO E. WAITE, OF ERIE, PENNSYLVANIA, ASSIGNOR TO ERIE MALLEABLE IRON COMPANY, OF ERIE, PENNSYLVANIA, A CORPORATION OF PENNSYLVANIA

WHEEL

Application filed April 18, 1929. Serial No. 356,110.

In the manufacture of wheels having a separate felloe from the wheel center it is important to have a mechanism for assembling the felloe rigidly on the wheel center. The present invention is designed to provide a simple and efficient means for clamping the felloe in place on the wheel center. Features and details of the invention will appear from the specification and claims.

A preferred embodiment of the invention is illustrated in the accompanying drawings as follows:—

Fig. 1 shows a side elevation of an assembled wheel, partly in section.

Fig. 2 a section on the line 2—2 in Fig. 1.

Fig. 3 an enlarged plan view of a part of the wheel, partly in section.

Fig. 4 a side elevation of the wheel felloe, partly in section.

1 marks the wheel center. This is provided with spokes 2 and pads 3. A channel-shaped felloe 4 with side walls of substantial depth is arranged on seats 5 on the outer surfaces of the pads 3. The felloe has protuberances 6 which extend into sockets 7, thus locking the felloe against driving strain and a shoulder 8 is provided at the opposite edge of the pad seats locking the felloe more completely in place against axial displacement.

The felloe is transversely separated at 9, thus permitting it to be sprung open sufficiently to place it in position on the seats.

A lever mechanism is mounted within the channel of the felloe and is adapted to draw the ends of the felloe together to clamp the felloe on the seats and preferably the same lever mechanism is designed to force the separation of the ends so as to expand the felloe and facilitate its removal. The lever 10 is pivotally mounted on a cross bolt 11. The lever is preferably formed of two plates secured together and at the fulcrum end of the lever these plates are separated forming a fork 12. Links 13 are pivotally secured to a cross bolt 14 extending across the felloe at the opposite side of the separation 9 from the bolt 11. The links 13 are pivotally secured to the lever 10 by a pin 15 which pin extends through the arms of the fork 12. Distance pieces 16—16 are arranged on the bolts 11 and 12 so as to locate the lever and links on the bolts.

The link is preferably bowed, or bent up at 17 so that as the lever 10 is swung down into the channel the link 13, by reason of the bow 17, will clear the bolt 11 and permit the pin, or pivotal connection of the link to be swung down to a point below the line joining the axes of the bolts 14 and 11. As the lever swings past this line joining the axes it locks the mechanism as the clamping strain on the link tends to pull the lever still further down and thus seats the lever in the bottom of the channel.

When it is desired to separate the ends of the felloe to faciltate the removal of the felloe from the wheel the lever is drawn up and the action of the lever operating through the links forces the separation of the ends, as clearly illustrated in Fig. 4.

What I claim as new is:—

1. In a wheel, the combination of a wheel center having felloe supporting seats; a felloe of channel shape in cross section separated transversely; and a lever mechanism mounted within the channel and drawing the separated ends together to clamp the felloe on the seats.

2. In a wheel, the combination of a wheel center having felloe supporting seats; a felloe of channel shape in cross section separated transversely; and a lever mechanism mounted within the channel and operative to draw the separated ends together to clamp the felloe on the seats and to separate the ends to facilitate the removal of the felloe from the seats.

3. In a wheel, the combination of a wheel center having felloe supporting seats; a felloe of channel shape in cross section separated transversely; and a lever mechanism mounted within the channel and drawing the separated ends together to clamp the felloe on the seat, said lever mechanism comprising links swung past centers in the lever mechanism to lock the lever mechanism in position closing the ends.

4. In a wheel, the combination of a wheel center having felloe supporting seats; a felloe of channel shape in cross section separated transversely; and a lever mechanism mounted within the channel comprising a lever pivotally mounted at one end of the channel, and links connecting said lever with the opposite end of the channel, said lever being housed by the channel when swung to bring the ends together.

5. In a wheel, the combination of a wheel center having felloe supporting seats; a felloe of channel shape in cross section separated transversely; and a lever mechanism mounted within the channel, said lever mechanism comprising a lever pivoted at one end of the channel, and links connected to the opposite end of the channel and the lever, said links having an off-set permitting the links to be swung past the line joining the centers of the link connection with the felloe and the lever connection with the felloe whereby the link connection with the lever may be swung beyond this line to lock the lever in set position.

6. In a wheel, the combination of a wheel center having felloe supporting seats; a felloe of channel shape in cross section separated transversely; and a lever mechanism mounted within the channel comprising a forked lever, a bolt extending across the channel forming a pivotal mounting for the forked end of the lever, links pivotally mounted to the forked end of the lever, and a bolt pivotally securing the opposite ends of the links to the opposite end of the felloe, said lever being housed by the channel as it is swung to set position.

In testimony whereof I have hereunto set my hand.

LORENZO E. WAITE.